(No Model.) 2 Sheets—Sheet 1.
F. B. WOOD.
AUTOMATIC SIGNALING APPARATUS.
No. 275,005. Patented Apr. 3, 1883.
Fig. 1,
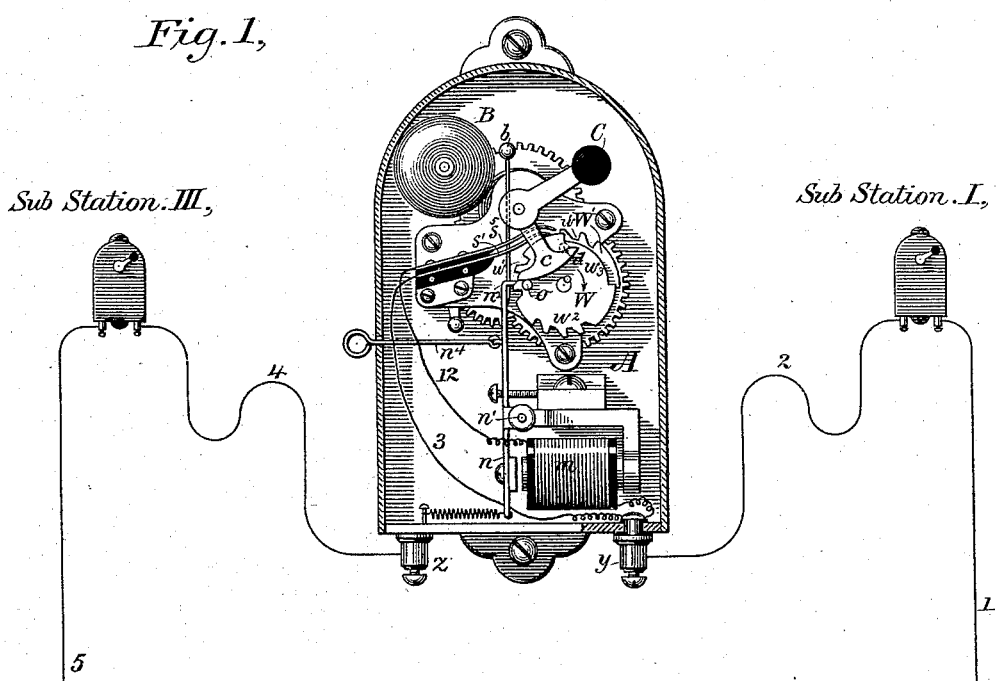
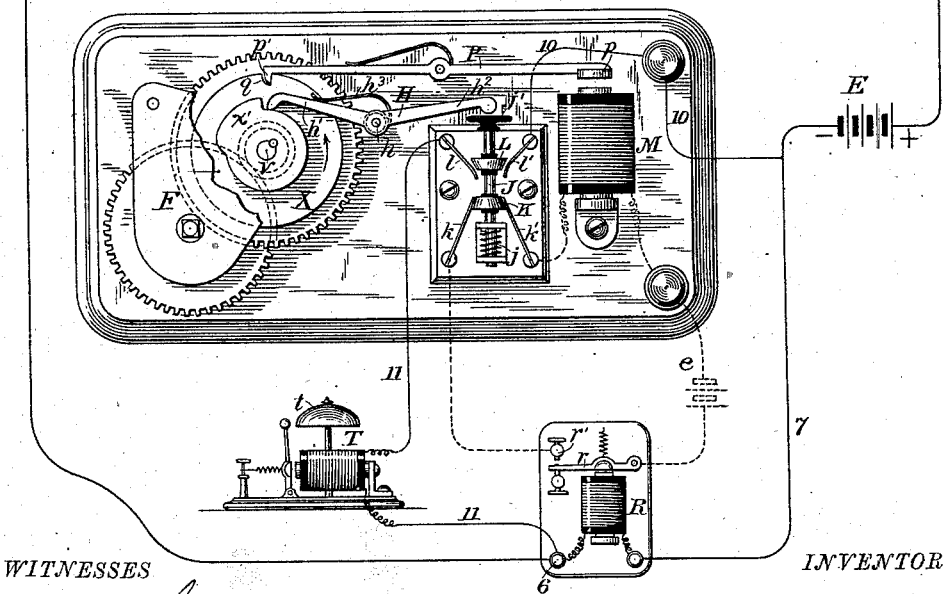
WITNESSES
Wm A. Skinkle
Geo. W. Breck.
By his Attorneys
Pope Edgecomb & Butler
INVENTOR
Frank B. Wood,

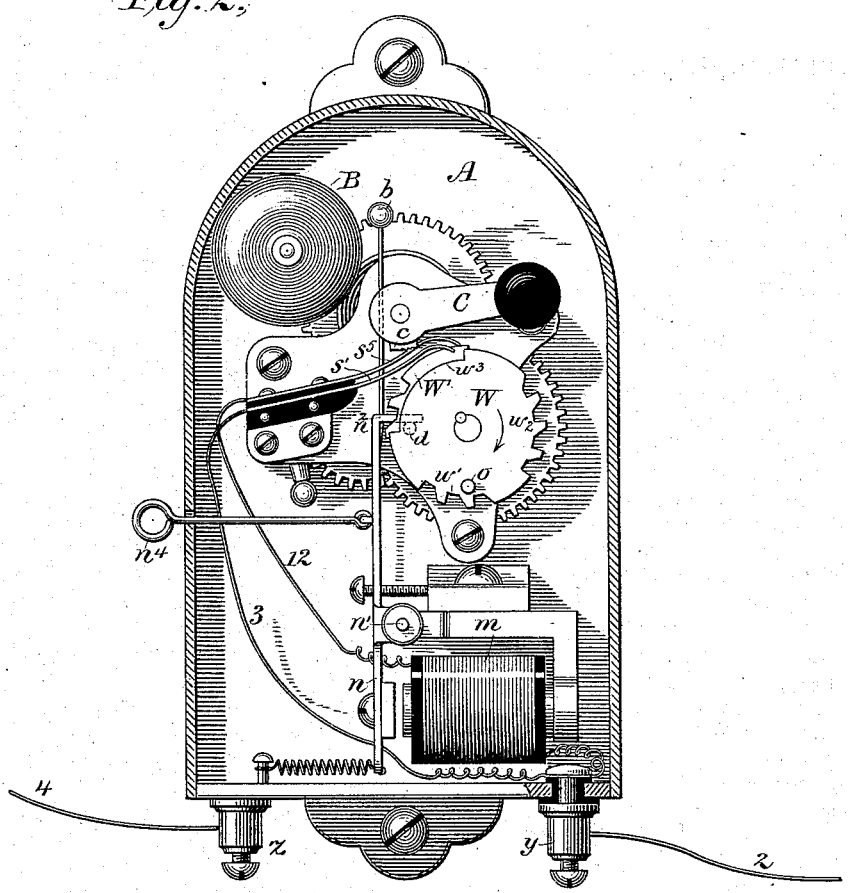

UNITED STATES PATENT OFFICE.

FRANK B. WOOD, OF NEW YORK, N. Y., ASSIGNOR, BY MESNE ASSIGN-
MENTS, TO THE GAMEWELL FIRE ALARM TELEGRAPH COMPANY,
OF SAME PLACE.

AUTOMATIC SIGNALING APPARATUS.

SPECIFICATION forming part of Letters Patent No. 275,005, dated April 3, 1883.

Application filed July 19, 1882. (No model.)

*To all whom it may concern:*

Be it known that I, FRANK B. WOOD, a citizen of the United States, and a resident of the city, county, and State of New York, have invented a new and useful System of Automatic Electric Signaling and Apparatus therefor, of which the following is a specification.

My invention relates to that class of electric signaling systems employed in fire-alarm districts and other similar municipal telegraphic organizations, which systems ordinarily comprise a principal or central station and two or more auxilliary or sub stations located at different points within the geographical district which the principal station is designed to serve. At each sub-station means are provided whereby a determinate arbitrary signal may be transmitted through an electric circuit to the principal station by setting in action automatic machinery attached to a circuit-breaker or transmitter, which, while in motion, sends a predetermined stereotyped signal appropriated to and designating the particular station. The signal thus transmitted is received by an operator at the principal or central station upon suitable apparatus actuated by an electro-magnet which responds to the electrical impulses from the sub-station. This electro-magnet may actuate a recording apparatus or register, and thus impress or mark the signals upon a moving strip of paper, or it may produce corresponding strokes upon a bell or gong, or both these methods may be used in conjunction, thus indicating to the attendant, either by the number of characters marked upon the paper or by the number of strokes upon the bell, the designating-number of the station from whence the signal has been sent.

The object of my invention is to provide a system whereby, after the completion of the transmission of a predetermined signal through an electric circuit from a sub-station to the principal station, a signal of acknowledgment will be automatically returned in like manner to the sub-station, thereby notifying the sender that his signal has been duly received. This end I attain by setting in operation at the principal station, through the action of an electro-magnet responding to the signals or impulses proceeding from the sub-station, automatic mechanism which produces an arbitrary signal of acknowledgment upon suitable receiving apparatus at the sub-station immediately after the completion of the reception of the original signal at the principal station.

The invention also embraces apparatus by means of which the attendant at the principal station is enabled at will to transmit to the sub station or stations non-automatic return-signals. Means are also provided whereby the character of each signal received by the attendant at the principal station, whether automatic or non-automatic, may be determined, thus enabling him to detect attempts which may be made by any person to transmit false signals by breaking and closing the circuit at points other than the proper signalizing-stations, or otherwise than by means of the proper mechanism provided for that purpose.

In the accompanying drawings, Figure 1 is a vertical transverse section of a signal-box constituting the sub-station, and exhibiting the construction and arrangement of the automatic mechanism, in connection with which the apparatus at the principal station and the uniting electric circuits are illustrated in diagram. Fig. 2 represents the apparatus of a signal-box in a different position.

In the drawings I have represented one principal or central station and three sub-stations, respectively designated as stations I, II, and III. I have shown the necessary apparatus for the automatic transmission of the station-signal and the reception of the return-signal at station II only, it being understood that the apparatus is precisely similar to this at sub-stations I and III, except as to the particular construction or arrangement of the circuit-breaking or transmitting wheel, which has a different signal stereotyped upon it at each sub-station, thus enabling the different station-signals to be readily distinguished one from another by the operator at the principal station, as hereinafter set forth.

The automatic transmitting apparatus at each sub-station preferably consists of a metallic circuit-breaking wheel, W, which is caused to revolve in one direction in a well-known manner by means of a train of wheel-work and a coiled spring, which, when a signal is to be transmitted, is wound up by means of a crank, C, and upon the crank being released by the hand of the operator the recoil of the spring, acting through the train of wheel-work, causes the transmitting-wheel W to perform one complete revolution in the direction indicated by the arrow in the figure. In the periphery of the wheel W recesses or notches $w'$ $w^2$ are formed, and these are arranged in systematic groups, so as to constitute a numerical signal. For example, in the wheel shown in the drawings the group $w'$ consists of three notches, signifying numeral 3, and the group $w^2$ of four notches, signifying numeral 4, the entire signal being "34." At $w^3$ an elongated notch or recess is cut from the periphery of the wheel of a length equal to about one-fourth of its entire circumference, the object of which arrangement will be hereinafter explained.

An insulated contact-spring, $s'$, is mounted upon a part of the frame supporting the above-described mechanism, and presses firmly by its own resiliency against the periphery of the circuit-breaking or transmitting wheel W, so as to form an electrical connection therewith as it revolves, except while one of the notches or spaces $w'$ $w^2$ $w^3$ is passing beneath its extremity. A metallic segment, W', is attached to the circuit-breaking wheel W; or it may be mounted upon the same axis and placed in electrical connection therewith. This segment occupies a portion of the circumference of the circle corresponding to, but a little greater than, that occupied by the portion of the transmitting-wheel W which has been cut away at $w^3$, as hereinbefore described, and is provided with a certain number of recesses or notches $w'$, similar to those of the transmitting-wheel W.

An independent insulated contact-spring, $s^5$, is so mounted as to project into the path of the segment W', and hence when the transmitting-wheel W has completed nearly three-fourths of an entire revolution the contact-spring $s^5$ will come in contact with the segment W' just before the contact is interrupted between the spring $s'$ and the wheel W. The contact-spring $s^5$ is connected by a wire, 12, to a small electro-magnet, $m$, mounted within the signal-box A, and thence to the binding-screw $y$. Hence it forms the terminal of a normally-open branch circuit diverging from the main line at $y'$, within which is included the electro-magnet $m$. The armature of the electro-magnet $m$ is fixed upon one arm of a lever, $n$, which lever is pivoted at $n'$, and carries at its opposite extremity a stop, $n^2$, normally projecting into the path of a pin, $d$, inserted in the transmitting-wheel W. The lever $n$ also carries a hammer, $b$, which, whenever the electro-magnet $m$ attracts its armature, is made to strike against a small bell or gong, B, and thus give an audible signal.

The apparatus at the principal station consists of an electro-magnet, M, which may be the same electro-magnet which is employed to actuate the recording or signaling apparatus, or may be an independent electro-magnet, as found most expedient in any particular case. The armature $p$ of this electro-magnet is mounted upon a lever, P, at the opposite extremity of which is a detent, $p'$, which normally engages with a notch or stop, $q$, and thereby holds in check a system of wheel-work, F, propelled by a spring or weight in a well-known manner, which, when released by the action of the electro-magnet M, will cause the axis $v$ and its attached wheel X, carrying a projection or cam, $x'$, to make one complete revolution, upon the completion of which revolution its motion is arrested by the engagement of the detent $p'$ with the stop $q$. The electro-magnet M is included in the circuit of an independent local battery, $e$, the course of which is indicated in the drawings by dotted lines. This local circuit traverses the rear contact of the armature-lever $r$ of a receiving electro-magnet or relay, R, which latter is included in the main electric circuit uniting the principal and sub stations, as hereinafter explained.

When the entire system is in its normal condition of rest the apparatus at the principal station and at the sub-stations occupy the respective positions represented in the drawings. The electric circuit which unites the several sub-stations with the principal station may be traced as follows: Commencing at the positive pole of the main battery E, which battery is preferably located at the principal station, a constant current normally traverses the wire 1 to the signal-box at sub-station I, going thence by wire 2 to the binding-screw $y$ of the signal-box at station II, thence by wire 3 to contact-spring $s'$, which is in electrical connection with the transmitting-wheel W, upon the periphery of which it rests. The current therefore passes through the wheel W and through the metallic frame of the signal-box A, upon which the latter is mounted, and thence to the attached binding-screw $z$, thence by wire 4 to sub-station III, and thence through any required number of precisely-similar sub-stations arranged in consecutive order upon the line, after which it returns by wire 5 to binding-screw 6, thence through the coils of the receiving electro-magnet R, and finally by wire 7 to the negative pole of the battery E. Thus it will be understood that the electro-magnet R is normally traversed by a constant current, and it consequently holds the lever $r$ away from its back contact-stop, $r'$, thus interrupting the circuit of the local battery $e$ and keeping the electro-magnet M demagnetized, so that its armature-lever P holds the mechanism F at the principal station in check by means of the stop $q$.

The contact-springs $l$ and $l'$ at the principal station form the respective terminals of a normally-open shunt-circuit which spans the receiving electro-magnet R, the spring $l$ being connected by a wire, 11, to the binding-screw 6, and the spring $l'$ in like manner, by the wire 10, to the wire 7. An insulated contact-plate, L, is mounted upon a spindle, J, which has a knob, $j'$, at its upper extremity, and is normally supported out of contact with the springs $l$ and $l'$ by a spring, $j$. K is another similar insulated contact-plate mounted upon the same spindle. $k$ and $k'$ are two contact-springs which normally press against the contact-plate K, and thereby complete the circuit of the local battery $e$ at that point. If, however, the spindle J be depressed by means of the knob $j'$, the normally-open shunt-circuit spanning the electro-magnet R will be closed, and at the same instant and by the same movement the local circuit through the electro-magnet M will be interrupted. This apparatus therefore constitutes a double circuit-changer or switch, the function of which will hereinafter be explained.

The operation of my improved signaling apparatus is as follows: If a person at sub-station II, for example, wishes to transmit a signal to the attendant at the principal or central station, he sets the transmitting-wheel W in motion by pulling down the crank C, and thereby winding up the coiled spring which impels the said wheel. The transmitting-wheel thereupon commences to revolve in the direction indicated by the arrow, and as the several spaces or notches $w'$ $w^2$ &c., upon its periphery successively pass beneath the contact-spring $s'$ the main circuit is automatically interrupted, and these successive interruptions or impulses, by their duration, frequency, and order of arrangement, indicate the designating-number of the particular sub-station upon the apparatus at the principal station in a well-known manner. The determinate signal indicating the locality of the sub-station is in this manner transmitted by the alternate breaking and closing of the circuit during the first three-fourths of a complete revolution of the wheel W, after which the motion of said wheel is arrested by the impingement of the pin $d$ upon the stop $n^2$ upon the end of the armature-lever $n$. The transmitting-wheel and its attachments are now in the position represented in Fig. 2 of the drawings.

It will be observed by an inspection of Fig. 2 that the new position of the transmitting-wheel is such as to form a contact between the spring $s^5$ and the segment W', while the previously-existing contact between the contact-spring $s'$ and the transmitting-wheel W is interrupted. Hence it will be understood that the electric current from the principal station, entering by the binding-screw $y$, now passes by the wire 12 through the electro-magnet $m$, and thence by the contact-spring $s^5$ to the segment W', and thence through the metallic frame of the signal-box to the binding-screw $z$, and so on, as in the first instance.

At the principal station the receiving electro-magnet R, in responding to the initial impulse produced by the first breaking of the circuit upon the transmitting-wheel W, releases its armature $r$, which latter falls on its back contact, $r'$, thus completing the local circuit from the battery $e$ through the electro-magnet M. The latter instantly attracts its armature $p$, thereby lifting the detent $p'$ and permitting the axis $v$ and its attachments to perform a revolution. When three-fourths of this revolution has been completed the cam or projection $x'$ upon the wheel X raises one arm, $h'$, of a lever, H, which has its fulcrum at $h$, and is normally pressed against the periphery of the wheel X by a spring, $h^3$. The opposite arm, $h^2$, of the lever H is correspondingly depressed and impinges upon the knob $j'$, forcing the spindle J downward, and thus simultaneously breaking the local circuit through the electro-magnet M and closing the normally-open shunt which spans the main-line receiving-magnet R.

The electrical resistance of the electro-magnet R is very much greater than that of the electro-magnet $m$ in the same circuit at the sub-station, and hence the effective strength of the main-line current normally traversing the electro-magnet R is so greatly reduced that it is insufficient to operate the electro-magnet M until the normally-open shunt at the principal station has been closed by the automatic operation which has been described. The instant that the resistance of the electro-magnet R is removed from the circuit by the closing of the shunt the current is materially strengthened, whereupon the electro-magnet $m$ attracts its armature, thus withdrawing the stop $n^2$ from the path of the pin $d$ upon the transmitting-wheel W at the sub-station, and permitting said wheel to continue its rotation until arrested by the impingement of a second pin, $o$, upon a stop, $c$, projecting from the crank C. During this latter portion of the revolution the notches $w'$ upon the segment W' pass beneath the contact-spring $s^5$, and thus successively open and close the main circuit, now traversing the branch and the electro-magnet $m$, thereby producing a corresponding number of strokes upon the bell B, and thus giving an audible signal, which informs the signalizer that the signal originally transmitted by him has been actually received or recorded at the principal station, inasmuch as the transmitting-wheel W cannot be automatically released nor the return-signal sounded by the electro-magnet $m$ unless the shunt has first been closed at the principal station, and this in turn cannot be effected except by the automatic operation of the mechanism set in action by the original impulses proceeding from the sub-station, or by the manipulation of the attendant at the principal station, as hereinafter explained.

In order to guard against the transmission of a false signal from a point other than a proper signal-station, which in the ordinary apparatus might be effected by a person familiar with the code of signals employed by alternately opening and closing the main conductor by means of a hand-key or otherwise, I make use of a tell-tale signal at the principal station. This is actuated by an electro-magnet, T, the resistance of which is comparatively small, preferably corresponding with that of the electro-magnets at the several sub-stations. This electro-magnet is employed to sound a signal-bell, $t$, and is placed at some convenient point in the normally-open shunt-circuit—as, for example, in the wire 11. This electro-magnet will necessarily be actuated by the alternate closing and breaking of the circuit by the notched segment W' during the time of the transmission of the return-signal, and thus all authorized and proper signals received and recorded by the electro-magnet M will necessarily be followed by a second signal upon the electro-magnet T; but this will not be the case when a fraudulent or unauthorized signal is transmitted in the manner hereinbefore referred to.

It may in some instances happen, by reason of a defective operation of the recording apparatus under the control of the electro-magnet M at the principal station, that the signal from a sub-station may not be recorded, but may nevertheless be read and understood from the sound of the electro-magnet R. In such cases, especially when the automatic apparatus for depressing the spindle J fails to act, the attendant may transmit the return-signal manually by depressing the knob $j'$, thus actuating the circuit-changing devices and releasing the transmitting-wheel at the sub-station in the manner hereinbefore described, but without affecting the electro-magnet of the recording mechanism in the local circuit.

A slide, $n^4$, extending outside the signal-box, is attached to the lever $n$ at each sub-station, by means of which the signalizer may withdraw the stop $n^2$ and release the transmitting-wheel W in order to repeat a signal in case no response is received from the principal station. This attachment, however, is not essential to the proper operation and use of the apparatus, and may be omitted, if preferred.

I claim as my invention—

1. The combination, substantially as hereinbefore set forth, of an electric circuit uniting a principal station with a sub-station, an automatic transmitter at the sub-station for sending a determinate signal through the said circuit to the principal station, automatic circuit-breaking mechanism at the sub-station for producing a determinate signal thereat, mechanism at the principal station for controlling said automatic signal-producing mechanism at the sub-station, and an electro-magnet at the principal station for releasing said controlling mechanism upon the initial impulse from the sub-station.

2. The combination, substantially as hereinbefore set forth, of an electric circuit uniting a principal station with a sub-station, an electro-magnet included in said circuit at the principal station for responding to signals transmitted from the sub-station, a local circuit which is opened and closed by the action of said electro-magnet, a second electro-magnet included in said local circuit for actuating, recording, or sounding mechanism, a normally-open shunt-circuit spanning the first-named electro-magnet, a circuit-closer for said shunt-circuit, a circuit-breaker for said local circuit, and a device for simultaneously actuating said circuit-closer and circuit-breaker, whereby signals may be produced at the sub-station without actuating the receiving mechanism at the principal station.

3. The combination, substantially as hereinbefore set forth, of an electric circuit uniting a principal station with a sub-station, an electro-magnet included in said circuit at the principal station for responding to signals transmitted from the sub-station, a local circuit which is opened and closed by the action of said electro-magnet, a second electro-magnet included in said local circuit for actuating, recording, or sounding mechanism, a normally-open shunt-circuit spanning the first-named electro-magnet, a circuit-closer for said shunt-circuit, a circuit-breaker for said local circuit, a device for simultaneously actuating said circuit-closer and circuit-breaker, whereby signals may be produced at the sub-station without actuating the receiving mechanism at the principal station, and mechanism under the control of the second electro-magnet for automatically actuating said device after the reception of a signal from the sub-station.

4. The combination, substantially as hereinbefore set forth, of an electric circuit uniting a principal station with a sub-station, an electro-magnet of comparatively great electrical resistance for receiving signals at the principal station, a normally-open shunt-circuit spanning said electro-magnet, and an electro-magnet of comparatively small resistance at the same station, which responds to signals from the sub-station when the resistance of the first-named electro-magnet is removed by the closing of its shunt, but not otherwise.

5. The combination, substantially as hereinbefore set forth, of an automatic circuit-wheel for transmitting determinate signals by alternately breaking and closing an electric circuit, a notched segment affixed to said circuit-wheel for alternately breaking and closing an independent or branch circuit during a determinate portion of its revolution and while the main circuit is held open, a stop for arresting the movement of said circuit-wheel after it has transmitted its proper signal and placed said branch circuit in connection with the main line, an electro-magnet for withdrawing said stop, and thus permitting said wheel to complete its movement, and a second stop for arresting the movement of said wheel after it has disconnected the branch circuit from the main line.

6. The combination, substantially as hereinbefore set forth, of an automatic circuit-wheel for transmitting determinate signals by alternately breaking and closing an electric circuit, and a notched segment affixed to said circuit-wheel for alternately breaking and closing an independent or branch circuit during a determinate portion of its revolution and while the main circuit is held open.

7. The combination, substantially as hereinbefore set forth, of an automatic circuit-wheel for transmitting determinate signals by alternately breaking and closing an electric circuit, a notched segment affixed to said circuit-wheel for alternately breaking and closing an independent or branch circuit during a determinate portion of its revolution and while the main circuit is held open, and an electro-magnet for giving signals, included in said independent or branch circuit.

8. The combination, substantially as hereinbefore set forth, of an automatic circuit-wheel for transmitting determinate signals by alternately breaking and closing an electric circuit, a notched segment affixed to said circuit-wheel, for alternately breaking and closing an independent or branch circuit during a determinate portion of its revolution and while the main circuit is held open, an electro-magnet for giving signals, included in said independent or branch circuit, and means, substantially such as described, for increasing the strength of the current traversing the branch circuit during the time of its alternate opening and closing by the action of the segment.

9. The combination, substantially as hereinbefore set forth, of an automatic circuit-wheel for transmitting determinate signals by alternately breaking and closing an electric circuit, a notched segment affixed to said circuit-wheel for alternately breaking and closing an independent or branch circuit during a determinate portion of its revolution and while the main circuit is held open, and a stop for arresting the movement of said circuit-wheel after the latter has transmitted its proper signal and placed the branch circuit in connection with the main line.

10. The combination, substantially as hereinbefore set forth, of an automatic circuit-wheel for transmitting determinate signals by alternately breaking and closing an electric circuit, a notched segment affixed to said circuit-wheel for alternately breaking and closing an independent or branch circuit during a determinate portion of its revolution and while the main circuit is held open, a stop for arresting the movement of said circuit-wheel after the latter has transmitted its proper signal and has placed the branch circuit in connection with the main line, and an electro-magnet for withdrawing said stop, and thus permitting the said wheel to complete its revolution.

11. The combination, substantially as hereinbefore set forth, of an automatic circuit-wheel for transmitting determinate signals by alternately breaking and closing an electric circuit, a stop for arresting the motion of said circuit-wheel after the transmission of its signal has been effected, a lever for withdrawing said stop and releasing the circuit-wheel, a signal-bell which is sounded by said lever when said stop is withdrawn, and an electro-magnet whereby said lever is actuated.

In testimony whereof I have hereunto subscribed my name this 8th day of July, A. D. 1882.

FRANK B. WOOD.

Witnesses:
JOSIAH A. HYLAND,
DANIEL W. EDGECOMB.